Feb. 3, 1970                    T. A. COFFEE                    3,493,886
         LASER GENERATOR HAVING CATHODE-LUMINESCENT PUMPING LIGHT SOURCE
Filed Jan. 19, 1965
                                                        3 Sheets-Sheet 1

Thomas A. Coffee,
        *INVENTOR.*
BY
        *ATTORNEYS*

Feb. 3, 1970 T. A. COFFEE 3,493,886
LASER GENERATOR HAVING CATHODE-LUMINESCENT PUMPING LIGHT SOURCE
Filed Jan. 19, 1965 3 Sheets-Sheet 2

Thomas A. Coffee,
INVENTOR.
BY
ATTORNEYS

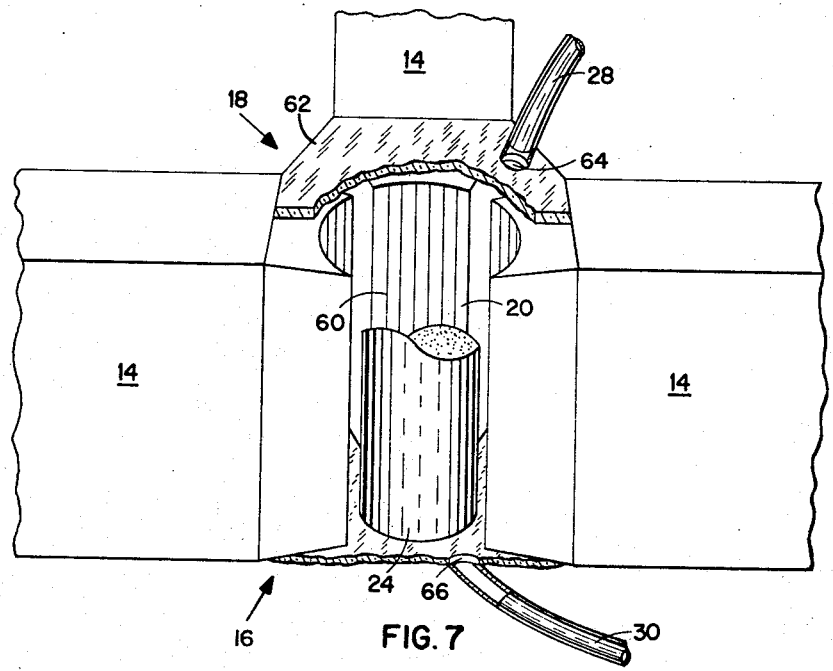
FIG. 7
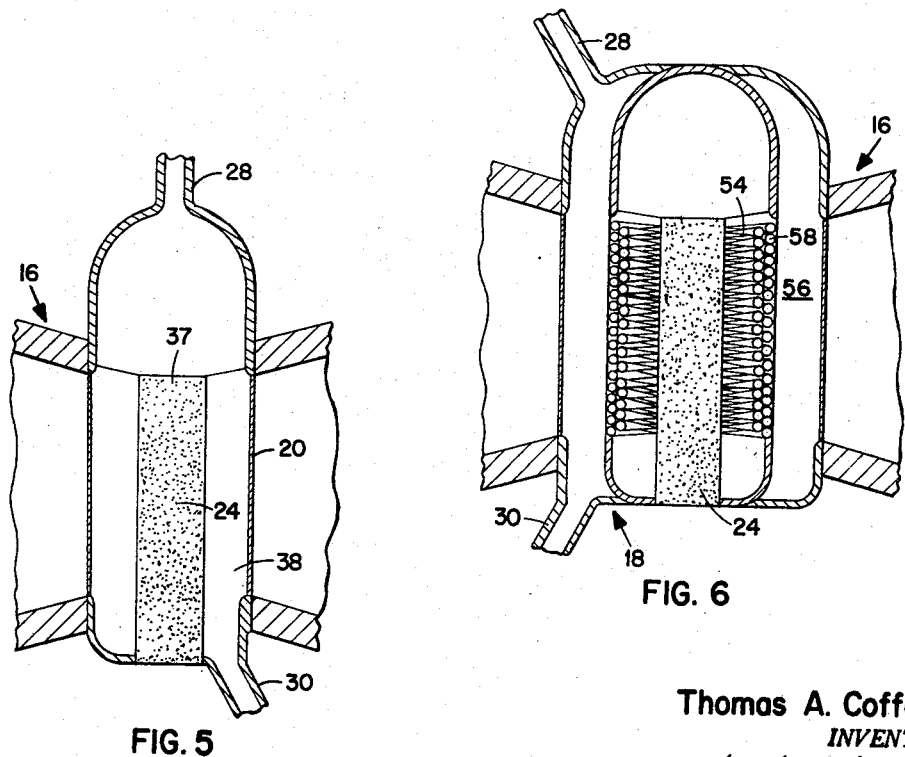
FIG. 5
FIG. 6
Thomas A. Coffee,
INVENTOR.

United States Patent Office 3,493,886
Patented Feb. 3, 1970

3,493,886
**LASER GENERATOR HAVING CATHODE-LUMI-
NESCENT PUMPING LIGHT SOURCE**
Thomas A. Coffee, 745 Del Monte,
Las Cruces, N. Mex. 88001
Filed Jan. 19, 1965, Ser. No. 426,701
Int. Cl. H01s 3/09
U.S. Cl. 331—94.5                             3 Claims

ABSTRACT OF THE DISCLOSURE

A laser including a laser medium having a luminescent material mounted in close proximity thereof. A plurality of cathode ray tubes mounted around the laser medium and the luminescent material is disposed for electron bombardment of the luminescent material which in turn, energizes the laser medium to produce stimulated emission. Focussing means are provided to concentrate the pumping energy on the laser medium.

---

The invention described herein may be manufactured and used by or for the Government for governmental purposes without the payment of any royalty thereon.

This application pertains to light amplification by stimulated emission of radiation. Apparatus for such amplification is now generally described as a laser.

Generally speaking, lasers may be defined as devices for application of excitation energy thereto to provide differential levels of energy in portions of the device for generation and amplification of light.

One characteristic of a laser is that it includes a medium, either liquid or solid, in which atoms can exist in a series of discrete energy levels. When radiant energy of the critical frequency is applied to the medium, portions of the atoms are excited and raised to higher energy levels. The excited atoms may then radiate energy spontaneously, emitting photons and reverting to the ground state. Also during the excitation period the atoms may be stimulated to emit photons by being struck by outside photons. Thus, in addition to the stimulating photons, additional photons of the same wavelength are produced.

In an atom the transition between energy levels is accomplished by energy absorption when going to the higher level and energy emission when going to the lower state. One method of such application to apply excitation energy is by radiation interaction. The energy change of the transition $A_E = h\nu$, where $h$ is Planck's constant and $\nu$ is the frequency of the radiation absorbed or emitted.

Therefore, if the medium be irradiated at a frequency critical to the difference in the energy levels of the medium, more power of the critical frequency will be radiated than is absorbed, thus producing a substantially coherent light output.

The problem in laser development is to provide a medium in which optimum portions thereof can be placed in an excited state so that when activated at discrete frequency or "pumped," a cascade of photons will be emitted. For a system to be pumped to cause emission of the photons from the active medium an excess of excited atoms is required in the medium to enable stimulated emission to predominate over absorption.

In one embodiment of the present application a crystal such as $CaWO_4Nd^3$, neodymium doped calcium tungstate is selected as the active medium because, in contrast to ruby, at least four levels participate in the cycle of laser action. The 1.06-micron line terminates about 2000 cm.$^{-1}$ above the ground state and this transition is the most favorable for laser action. In all four level materials including also samarium, thulium, holmium and uranium in a host such as calcium fluoride, the terminal transition is not the ground level. This enables stimulated emission to occur at a fraction of the pump energy input required for the 3 level lasers, ruby for example, in which case the excited atoms may give up some of their energy to the crystal lattice and land temporarily in a metastable state. If not subjected to stimulation they drop at random to the ground state. The first few photons emitted by the atoms in their drop from the metastable to ground state stimulate the still excited chromium atoms to give up photons and tumble to the ground state.

In the present invention pumping is accomplished by bombarding an activating material with electrons. The pumping material may be gases, liquid organic phosphors, crystalline phosphors, or inorganic liquid phosphors having particles such as zinc-cadmium-sulfide or zinc-orthosilicate held in suspension. At any rate, the electron bombardment of the pumping material causes irradiation of the medium, mounted in close proximity of the pumping material, and raises most of the atoms of the medium to the excited or higher energy state.

The crystal medium, may be machined to form a rod about two inches long and a quarter inch in diameter or various other configurations. The ends of the rod are polished to provide optically flat parallel surfaces and the rod is optically aligned between externally mounted mirrors, or else both surfaces are silvered or dielectric coated. A substantially central aperture of at least 2% of the area is provided through the coating or exit mirror at one end and the rod is irradiated by a phosphor to provide the pumping for the photon emission.

Photons traveling in directions substantially parallel to the prime axis of the rod are reflected back and fourth between the reflecting surfaces to constitute a concentration of photons passing through the aperture in substantially a single direction to provide an intense light beam.

Such a device provides new apparatus for communication both within the atmosphere and in areas of outer space. The laser can be incorporated in a superior type of apparatus similar to radar which may be a "lidar" and includes apparatus to direct the concentrated beam and pin point a target. Such a beam is reflected and the apparatus includes a mechanism to detect the reflected beam and provide a picture of the target having a clarity never before attained. The term "lidar" is coined from the phrase, light directing and ranging.

Several other applications of the laser can be included in telemetry relays, timing, distribution, air to ground data transmission, etc. The laser's power also can be focused to produce intense heating in a target.

It is, therefore, an object of the present invention to provide a device for generation, amplification, and modulation of substantially coherent light.

The principles of the present invention will be better understood from the following detailed description taken in conjunction with the accompanying drawings in which:

FIGURE 5 is an elevational sectional view of one embodiment of the invention having the activating medium coated on the laser medium.

FIGURE 6 is an elevational sectional view of the device of the invention including a housing enclosing a laser material having a solid phosphor coated therein and fiber optics carried in the housing for focusing the pumping light.

FIGURE 7 is a pictorial view of the housing of the device of the present invention utilizing an activating material of solid phosphors coated in the electron permeable windows.

Figure 1:
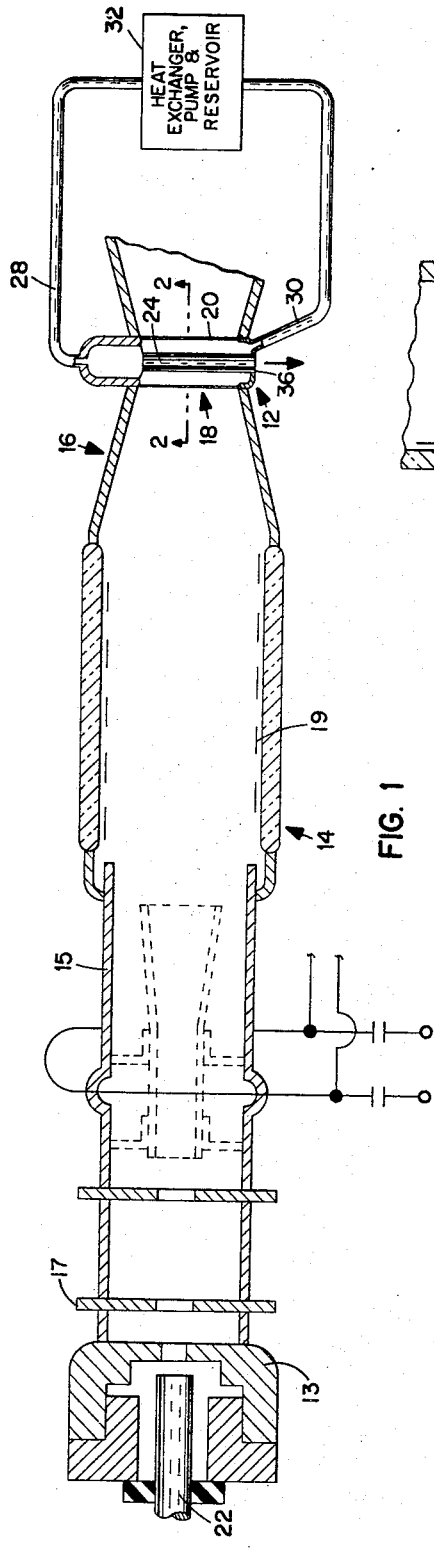
FIGURE 1 is an elevational sectional view of an embodiment of the invention including a plurality of cathode ray devices arranged around the laser medium.
Figure 2:
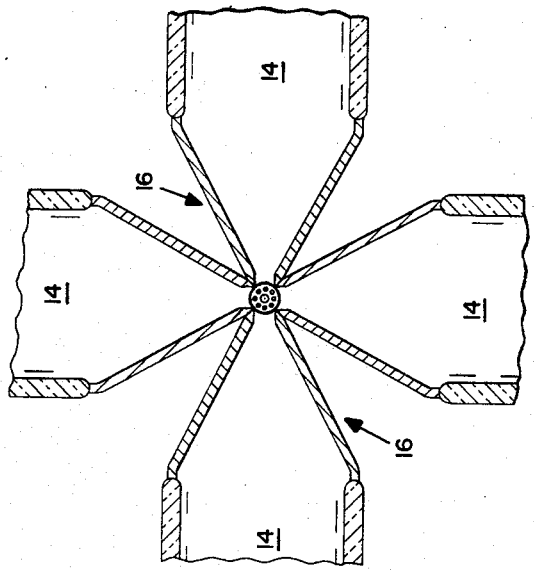
FIGURE 2 is a fragmentary plan view, partially in section of the embodiment of FIGURE 1.
Figure 3:
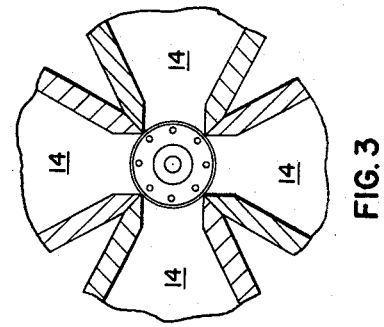
FIGURE 3 is an enlarged plan view of the housing of FIGURE 2.

Referring now to FIGURE 1, a laser generally designated by the numeral 12, includes a cathode ray tube 14 including a body portion 15 and a forward portion 16 including a housing 18, of heat conducting material. Housing 18 is provided with an electron permeable window 20 and a medium 24, having discrete energy levels, is secured in housing 18 for energization to emit a substantially coherent beam of light.

The cathode ray device 14 may be provided with a cathode 22 which may be either a dispenser type cathode ($\simeq 10$ a./cm.$^2$) or a tungsten hair pin cathode, a control grid 13 and a limiting disc 17. Body 15 of the cathode ray tube may be made of stainless steel or ceramic material.

The tube is similar in operation to the typical cathode ray tube as far as electron-beam focusing and deflection are concerned. The tube is considerably more compact, however, since wide scanning of the electron beam is not required. The tube also differs from the conventional tube in that the beam is focused on a small face plate or window rather than a screen. The beam may be focused magnetically and deflection plates may be utilized to electrostatically deflect the beam, if desired.

To achieve high beam energy, a graphite post deflection accelerating spiral 19 is provided in the forward portion 16 of body 15 to create a uniform field gradient over most of the deflection region.

A pumping source, such as liquor phosphor, is passed through housing 18 to irradiate the medium for excitation thereof responsive to the pumping source being bombarded by the electrons passing through window 20. The electron bombardment produces an intense narrow band light output which irradiates medium 24 at a predetermined frequency closely matching its acceptance band (absorption region) to enable stimulated emission of radiation to occur. The emission is in the form of nearly coherent radiant energy.

However, the window and the pumping source heats appreciably when subjected to electron flow. Therefore, housing 18 is provided with inlet and outlet conduits 28 and 30, respectively, which are disposed in communication with a heat exchanger 32. The liquid flows through the housing to the heat exchanger and is cooled and recirculated through the housing.

In operation the cathode ray tube 14 is energized and the electrons emitted by the cathode are rectangularly focused on windows 20 to pass therethrough and penetrate into the phosphor-pumping source. The electrons strike the pumping source and cause emission of photon energy mostly within the absorptivity bands of the medium. One of the preferred adsorption bands for CaWO$_4$Nd$^3$ is 5600 to 6000 Å. Photon energy enters the medium to excite the medium to higher energy levels for emission of radiant energy. The energy may be collimated to form a concentrated beam. The pumping source is selected to match the absorptivity bands of the medium.

As shown in the drawings, the apparatus includes a plurality of cathode ray devices 14 having a housing 18 mounted at the forward portions thereof. Laser medium 24 is mounted in housing 18 and the housing is provided with a plurality of electron permeable windows 20 which are penetrated by the electrons to bombard medium 24.

Housing 18 surrounds the medium except at the end 36 (FIGURE 1) thereof from which the photons are emitted; the housing being sealed also at this end to prevent leakage of the pumping material. In this embodiment of my invention, the cathode ray tubes may be operated independently or simultaneously, depending on the power required for any particular application of the device.

Figure 4:
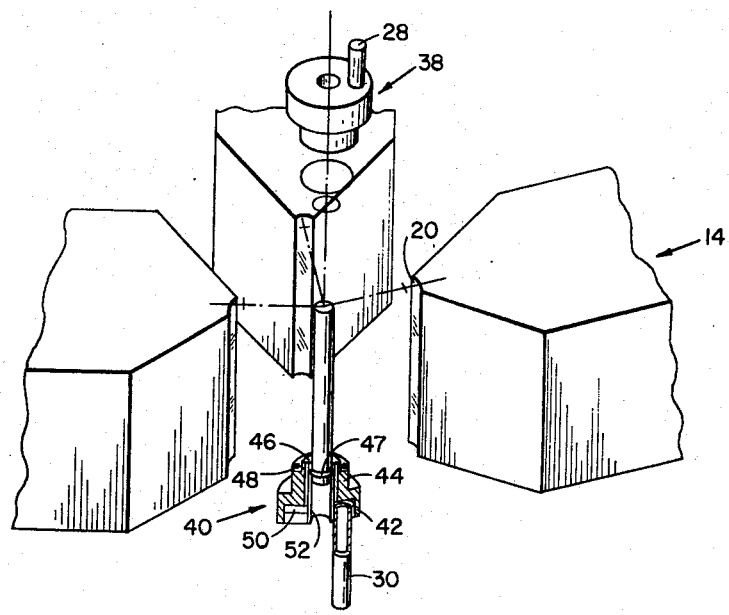
FIGURE 4 is an exploded view of the laser medium and housing and cathode ray devices arranged in quadrature around the housing and laser medium. One of the cathode ray devices being removed for clarity.

FIGURE 4 illustrates a housing which may be utilized with the cathode ray gun of FIGURE 1. In this form of the housing, the laser medium 24 is supported between upper and lower support members 38 and 40. Each of members 38 and 40 are similar in construction and includes outer intermediate and inner annular portions 42, 44 and 46, respectively. Portion 42 is provided with the largest diameter and portion 46 with the smallest diameter of the three. Portion 44 serves as a seat for windows 20 of the device 14 when the windows are disposed in abutting relationship against portion 46. An O-ring seal 47 is disposed in support members 38 and 40 adjacent portion 46 and around the laser medium 24. Another O-ring seal is carried in a groove 48 provided on the outer surface of intermediate portion 44 to prevent leakage of fluid. An annular chamber 50 is provided in portion 42 of members 38 and 40 and inlet and outlet conduits 28 and 30 are respectively disposed in members 38 and 40 in communication with chambers 50. A plurality of radially arranged ports 52 extends longitudinally through members 38 and 40. Ports 52 are disposed in communication with chambers 50 and open through portion 46 of members 38 and 40. When the apparatus is assembled a cavity is formed intermediate windows 20 and laser medium 24 into which ports 52 communicate.

In this form of the invention a suitable liquid phosphor is pumped from reservoir 32 through conduit 28, into chamber 50 and ports 52 of member 40 and into the cavity between medium 24 and windows 20. The phosphor is circulated through ports 52, chamber 50 of member 38 to be carried back to reservoir 32 through conduit 30. Energization of the laser medium is accomplished as explained, supra.

A still further embodiment of my invention, illustrated in FIGURE 5, includes the photon emissive medium 24 having a coating of crystalline phosphor 37 thereon. The crystalline phosphor, in this embodiment, serves as the pumping material, and a coolant 38 is circulated around the medium and the pumping material and through heat exchanger 32 to carry away the heat generated by the electron bombardment. The coolant may be simple liquid or cryogenics, as required.

In another embodiment of my invention, illustrated in FIGURE 6, the pumping light is focused on the medium by the use of fiber optics. In this embodiment, medium 24 is mounted in housing 18 substantially along the longitudinal axis of the housing. A bundle of tapered quartz fibers 54 encloses the medium and extends therefrom to form a chamber 56 between the housing and the ends 58 of fibers 54. The chamber is disposed in communication with heat exchanger 32 by means of inlet and outlet conduits 28 and 30 respectively. The pumping material is disposed to flow around the medium for irradiation of the medium responsive to electron bombardment of the pumping material. The heat exchanger cools and recirculates the pumping material through the housing.

The tapered quartz fibers are disposed to accumulate large areas of pump energy and to concentrate this energy onto the medium with a much greater photon power density than could be otherwise attained. The fibers may be designed to taper in substantially a 10:1 entrance to exit diameter ratio or any other entrance to exit diameter ratio as may be desired.

FIGURE 7 illustrates another embodiment of my invention; however, in this embodiment, phosphor, such as a modified P20 zinc cadmium sulfide (to pump CaWO$_4$Nd$^3$), may be coated on the windows 20 of housing 18. The windows may be of material such as beryllium and provided with structural ribs 60 to strengthen and support the windows. All inner surfaces are made of highly reflective material including the ends 62 of housing 18, which, in this embodiment, are provided with openings 64 and 66 having inlet and outlet conduits 28 and 30 respectively, sealed therein.

A coolant, such as 0° C. water or cryogenic gas, for example, is disposed for flow around the rod 24 and against windows 58 to carry the heat out of the assembly before it has time to be thermally conducted to the crystal.

It is understood that the phosphors referred to above are selected for a particular emission characteristic. For example, zinc-ortho-silicate has an emission that closely matches one of the acceptance bands for rubies (5150–5850 A.). Therefore the system becomes a matched spectrum system.

Figure 9:
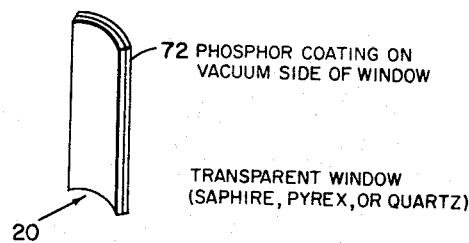
FIGURE 9 is a pictorial view of another embodiment of an electron permeable window as used in the invention.
Figure 8:
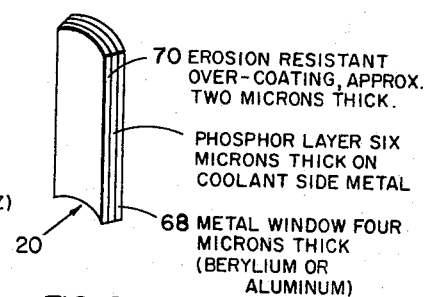
FIGURE 8 is a pictorial view of one embodiment of an electron permeable window as used in the invention.

FIGURES 8 and 9 illustrate a pair of windows as used in the form of the invention utilizing solid phosphors as the activating material. In FIGURE 8, a metal window such as berylium or aluminum, approximately four microns thick is provided on the coolant side thereof with a phosphor layer 68 approximately six microns thick. Coated on the phosphor layer is an erosion resistant overcoating 70, approximately two microns thick.

In the form of the window of FIGURE 9, the window is made of transparent material, such as sapphire, pyrex or quartz having a phosphor coating 72 on the vacuum side.

It is to be understood that in the form of the invention utilizing liquid phosphors only an electron permeable window is used.

The device of the present invention may be utilized in a communications system, if desired. Photomultiplier tubes would be utilized as the receiver and modulation of the electron-beam excitation of the phosphor can be accomplished by intensity modulation of the beam at the gun by applying a signal, in conventional manner between control grid 17 and cathode 22. Of course a modulation signal could be applied individually to each unit if desired or through a common circuit for simultaneous modulation of each tube.

I claim:
1. A device for the generation and propagation of an intense beam of substantially coherent light comprising:
   (a) a medium having a plurality of discrete energy levels secured in said device and disposed for excitation and subsequent energization at multiple levels for emission of substantially coherent light;
   (b) a plurality of cathode ray tubes arranged in quadrature around said medium, said cathode ray tubes disposed for independent or joint operation for emitting a stream of electrons to said medium, each of said cathode ray tubes being sealed at one end thereof by an electron permeable window, each of said electrol permeable window having a concave surface, which in response to the assembly of said cathode ray tubes in said quadrature arrangement forms an enclosure about said medium;
   (c) phosphor pumping means coated on said windows and disposed for energization by said electron flow to irradiate said medium for the emission of coherent light;
   (d) a pair of end support members having an axial opening therethrough for support of said medium therein in spaced relation with said windows to complete said enclosure;
   (e) each of said end support members comprising an inner portion, an intermediate portion, and an outer portion, disposed radially in concentric relation and axially in stepped relation, the outer portion having the least axial length and the inner portion the greatest axial length;
   (f) seat means provided on the stepped portion formed at the intersection of said inner and intermediate portions, said seat means disposed for support therebetween, of the ends of said cathode ray tubes having said electron permeable windows secured thereto;
   (g) a coolant disposed in said enclosure for circulation around said medium to dissipate the heat generated responsive to electron emission and medium energization;
   (h) a coolant inlet conduit connected to the larger diameter portion of the other end support member, each conduit being connected to said enclosure via an annular passage in said larger diameter portion of said respective end support members and a plurality of axially disposed ports connecting said annular passage and said enclosure.

2. The device of claim 1 with said medium comprising a neodynium-doped calcium tungstate crystal.

3. The device of claim 1 wherein said electron permeable windows include a beryllium member, a coating of phosphor thereon and an erosion resistant overcoating disposed on said phosphor coating.

References Cited

UNITED STATES PATENTS

| | | | |
|---|---|---|---|
| 3,176,138 | 3/1965 | Coffee | 250—199 |
| 3,202,934 | 8/1965 | Coffee | 331—94.5 |
| 3,297,958 | 1/1967 | Weiner | 331—94.5 |
| 3,314,021 | 4/1964 | Haun et al. | 331—94.5 |
| 3,349,339 | 10/1967 | Thorington | 331—94.5 |

OTHER REFERENCES

Oglond et al., Cathodoluminescence for CaWO$_4$:Nd Laser Pumping, Appl. Phys. Lttrs., vol. 4, No. 7, pp. 133–4, Apr. 1, 1964.

RONALD L. WIBERT, Primary Examiner

R. J. WEBSTER, Assistant Examiner

U.S. Cl. X.R.

250—199